(12) United States Patent
Fleury et al.

(10) Patent No.: US 12,508,654 B2
(45) Date of Patent: Dec. 30, 2025

(54) INSPECTION DEVICE FOR MANUFACTURING A PART WITH ADDITION OF MATERIAL

(71) Applicants: OFFICE NATIONAL D'ETUDES ET DE RECHERCHES AÉROSPATIALES, Palaiseau (FR); UNIVERSITE DU MANS, Le Mans (FR)

(72) Inventors: Bruno Fleury, Palaiseau (FR); Pascal Picart, Le Mans (FR); Matthieu Piniard, Palaiseau (FR); Béatrice Sorrente, Palaiseau (FR)

(73) Assignees: OFFICE NATIONAL D'ETUDES ET DE RECHERCHES AÉROSPATIALES, Palaiseau (FR); UNIVERSITE DU MANS, Le Mans (FR)

( * ) Notice: Subject to any disclaimer, the term of this patent is extended or adjusted under 35 U.S.C. 154(b) by 603 days.

(21) Appl. No.: 18/016,567

(22) PCT Filed: Jul. 6, 2021

(86) PCT No.: PCT/FR2021/051249
§ 371 (c)(1),
(2) Date: Jan. 17, 2023

(87) PCT Pub. No.: WO2022/018339
PCT Pub. Date: Jan. 27, 2022

(65) Prior Publication Data
US 2023/0278108 A1    Sep. 7, 2023

(30) Foreign Application Priority Data

Jul. 20, 2020    (FR) .................................... 20 07572

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 12/90* (2021.01); *B33Y 30/00* (2014.12); *B33Y 50/02* (2014.12)

(58) Field of Classification Search
CPC .......... B22F 10/28; B22F 10/20; B22F 10/85; B29C 64/268; B29C 64/393; B29C 64/153
See application file for complete search history.

(56) References Cited

U.S. PATENT DOCUMENTS 5,427,733 A * 6/1995 Benda .................... B29C 64/153
                                                          419/10
9,925,715 B2 * 3/2018 Cheverton .............. B22F 12/49
(Continued)

FOREIGN PATENT DOCUMENTS

CN    111610621 A *   9/2020   ......... G01N 21/6458
EP    3 650 141        5/2020
(Continued)

OTHER PUBLICATIONS

International Search Report and Written Opinion of the ISA for PCT/FR2021/051249, mailed Sep. 28, 2021, 13 pages.
(Continued)

*Primary Examiner* — Thien S Tran
(74) *Attorney, Agent, or Firm* — Maier & Maier, PLLC

(57) ABSTRACT

A device for manufacturing a piece with addition of material includes an optical inspection unit for capturing at least one holographic image of a transformation zone of the material, in real time while the piece is being manufactured. A processor then characterizes a topography of the transfor-
(Continued)

mation zone from each holographic image. Such manufacturing device may be in particular of 3D-printer type, or a welding device.

20 Claims, 4 Drawing Sheets

(51) Int. Cl.
    *B22F 12/90*       (2021.01)
    *B33Y 30/00*       (2015.01)
    *B33Y 50/02*       (2015.01)

(56) References Cited

U.S. PATENT DOCUMENTS

| | | | |
|---|---|---|---|
| 10,048,661 B2* | 8/2018 | Arthur | G05B 19/401 |
| 2007/0279639 A1* | 12/2007 | Hu | G01B 11/2441 |
| | | | 356/512 |
| 2009/0206065 A1* | 8/2009 | Kruth | B29C 64/393 |
| | | | 219/121.65 |
| 2011/0108531 A1* | 5/2011 | Stokes | B23K 26/40 |
| | | | 219/121.68 |
| 2013/0168902 A1* | 7/2013 | Herzog | B23K 31/125 |
| | | | 264/401 |
| 2013/0265566 A1* | 10/2013 | Smith | G01N 21/359 |
| | | | 356/402 |
| 2014/0144895 A1* | 5/2014 | Stork Genannt Wersborg | |
| | | | B23K 26/042 |
| | | | 219/121.75 |
| 2015/0048064 A1* | 2/2015 | Cheverton | B23K 26/34 |
| | | | 219/121.64 |
| 2016/0184893 A1* | 6/2016 | Dave | B29C 64/393 |
| | | | 419/53 |
| 2016/0185048 A1* | 6/2016 | Dave | B22F 10/368 |
| | | | 700/119 |
| 2017/0173695 A1* | 6/2017 | Myerberg | B29C 64/106 |
| 2017/0259504 A1* | 9/2017 | Lin | B33Y 30/00 |
| 2017/0266762 A1* | 9/2017 | Dave | B22F 10/28 |
| 2017/0368640 A1* | 12/2017 | Herzog | B22F 12/49 |
| 2018/0154442 A1* | 6/2018 | Milshtein | B23K 26/342 |
| 2018/0154443 A1* | 6/2018 | Milshtein | B22F 12/41 |
| 2018/0185963 A1* | 7/2018 | Ostroverkhov | B23K 26/123 |
| 2018/0207725 A1* | 7/2018 | Chen | B23K 26/0006 |
| 2018/0207750 A1* | 7/2018 | Carter | B29C 64/386 |
| 2018/0281067 A1* | 10/2018 | Small | B33Y 50/02 |
| 2019/0323951 A1* | 10/2019 | Gold | B22F 10/31 |
| 2020/0130279 A1* | 4/2020 | Dicken | B23K 26/342 |
| 2020/0147867 A1* | 5/2020 | Gold | B29C 64/277 |
| 2020/0316720 A1* | 10/2020 | Liu | G01B 11/303 |

FOREIGN PATENT DOCUMENTS

| | | | | |
|---|---|---|---|---|
| WO | WO-2019226463 A1 * | 11/2019 | | B29C 64/268 |
| WO | WO-2020095453 A1 * | 5/2020 | | B29C 64/286 |
| WO | WO-2020169433 A1 * | 8/2020 | | B23K 26/034 |

OTHER PUBLICATIONS

Bordbar et al., "Application of complex field imaging sensor to additive Manufacturing", Enhanced and Synthetic Vision 2003, Conference Enhanced and Synthetic Vision 2002, Apr. 21, 2003, Proceedings of SPIE ISSN 0277-786X, SPIE, us, vol. 11305, Feb. 21, 2020, pp. 113050G-113050G, XP060128791.

Zhao et al., 11 Experimental validation and characterization of a real-time metrology system for photopolymerization-based stereolithographic additive manufacturing process, The International Journal of Advanced Manufacturing Technology, vol. 91, No. 1, Dec. 3, 2016, pp. 1255-1273, XP036244887.

* cited by examiner

INSPECTION DEVICE FOR MANUFACTURING A PART WITH ADDITION OF MATERIAL

This application is the U.S. national phase of International Application No. PCT/FR2021/051249 filed Jul. 6, 2021, which designated the U.S. and claims priority to FR Patent Application No. 20 07572 filed Jul. 20, 2020, the entire contents of each of which are hereby incorporated by reference.

BACKGROUND OF THE INVENTION

Field of the Invention

This description relates to a device for manufacturing a piece with addition of material, in which the material intended to constitute part or all of the piece is temporarily transformed in order to be fixed to the piece being manufactured.

Description of the Related Art

Many devices are designed for manufacturing pieces by using additions of material, the material being most often melted or temporarily liquefied to be added to the piece being manufactured.

Some of these manufacturing devices belong to the shaping means commonly called "3D-printers". They proceed by successively adding material to a piece being created, at locations predetermined to produce the final desired shape for the piece. The portions of material which are added contribute to the progressive creation of the piece, and the transient state of melted or liquefied material ensures that the piece ultimately obtained exhibits a material continuity, without cracks or defects likely to cause breaks later on. In 3D-printing devices referred to as SLM, for "Selective Laser Melting®", also designated as LBM for "Laser Beam Melting" or selective fusion produced by laser on powder bed, a container is filled with a powder of the material intended to form the piece, and this powder is locally and selectively melted at variable locations in the container by irradiation with a laser beam in order to aggregate it so as to form the piece through successive layers. The remaining powder, which has not been aggregated, is then eliminated to recover the piece, whose integrity depends on the spatio-temporal qualities of the instantaneous powder fusion zone.

Other manufacturing devices which also proceed by addition of material produce welds to connect piece portions that are initially separate. The configuration of the piece portions to be connected is highly variable. For example, they may be very large juxtaposed metal portions which are to be connected by a welding operation performed in an area that is moved progressively along a juxtaposition path of the portions. Alternatively, it may be sites to be welded which are distributed in a surface, for which a "wave soldering" process can be used. In all these welding techniques, the quality of the bond between the piece portions that are joined depends on the structure, shape, and properties of the fusion zone where the welding material is brought to a liquid state and then resolidified.

For all these manufacturing processes where the constituting material of the piece in its final state is temporarily melted and then resolidified, the fusion zone determines the quality and properties of the piece which is ultimately obtained. For certain manufacturing devices, this fusion zone, also called a melt pool, is spatially located at a fixed location, and the piece is progressively moved in order to continue its manufacture incrementally. But in many manufacturing devices used in the industry, especially because of the size and/or the weight of the piece that is being manufactured, the piece remains fixed and instead one moves the location where the energy required to temporarily melt the material is supplied. The fusion zone is then likely to be moved over distances that are much greater than its own dimensions during creation of the piece. For this reason, records of images which are performed with an entrance optical field of view that is fixed are not very suitable for monitoring the fusion zone, because the images then have insufficient spatial resolution inside this fusion zone.

Furthermore, most of the imaging techniques that have been applied for visualization of a fusion zone do not provide a three-dimensional characterization of its shape, but only a two-dimensional characterization. For example, some of these techniques, when applied to the LBM process, only provide fusion zone characterizations that relate to dimensions parallel to the powder bed. Other techniques provide height information based on a single coordinate whose value may vary parallel to the powder bed. These latter techniques include TD-OCT techniques, for "Time-Domain Optical Coherence Tomography", and SD-OCT, for "Spectral-Domain Optical Coherence Tomography", the latter in its ICI version, ICI standing for "Inline Coherent Imaging", and techniques which make use of a camera whose line of sight is parallel to the powder bed. For all these techniques, at least one coordinate is missing in comparison with a three-dimensional characterization of the surface of the fusion zone. However, the physical phenomena that generate this shape, such as wetting behavior and heat diffusion, are three-dimensional by nature.

Based on this situation, an object of the present invention is to simply and efficiently visualize the fusion zone, or more generally the material transformation zone, of a method of manufacturing pieces by addition of material, in particular a method of manufacturing by 3D-printing or by welding. More specifically, the invention aims at providing a three-dimensional representation of the transformation zone in real time while each piece is being manufactured, and with sufficient temporal resolution.

Another object of the invention is to provide a technique for controlling a manufacturing method that can be implemented in situ, i.e. in a way that is integrated into the manufacturing device.

Yet another object of the invention is to provide such three-dimensional representation with sufficient spatial resolution, along three perpendicular directions, to allow diagnosis of the instantaneous manufacturing conditions for the piece.

SUMMARY OF THE INVENTION

To achieve at least one of these or other goals, the invention proposes a new manufacturing device for manufacturing a piece through addition of material, wherein energy supply means are adapted to transform a quantity of material to be added to the piece being manufactured, within a transformation zone of the material which is effective at a time when the quantity of material is being fixed to the piece. According to the invention, this manufacturing device comprises optical inspection means for providing at least one representation of the transformation zone in real time while the piece is being manufactured. These optical inspection means themselves comprise:

at least one inspection light source, which is adapted for producing an inspection light beam;

an image sensor array;

a beamsplitter, which is arranged to split the inspection light beam into an illuminating beam and a reference beam;

an illumination optical path, which continually connects the beamsplitter to the transformation zone while the piece is being manufactured, and which is intended for the illuminating beam;

a reference optical path, which continually connects the beamsplitter to the image sensor array while the piece is being manufactured, and which is intended for the reference beam; and a transfer optical path, which continually connects the transformation zone to the image sensor array while the piece is being manufactured, and which is intended for the backscattered radiation that is produced by the illuminating beam when this latter beam is incident onto the transformation zone, this transfer optical path being adapted so that the backscattered radiation forms an image of the transformation zone on the image sensor array.

These optical inspection means are arranged so that the image sensor array produces, for each readout sequence of this sensor, readout data which correspond to a superposition of the backscattered radiation transmitted by the transfer optical path with the reference beam transmitted by the reference optical path.

According to a first feature of the invention, each inspection light source is a laser source, and the readout data from the image sensor array, for each readout sequence thereof, form a holographic image of the transformation zone which relates to a time when the piece is being manufactured.

According to a second feature of the invention, the optical inspection means further comprise at least one processor which is adapted for executing an algorithm for extracting a two-dimensional phase distribution from the holographic image, and converting this two-dimensional phase distribution into numerical values which characterize a topography of the transformation zone. This topography characterization constitutes a three-dimensional representation of the transformation zone. The numerical values obtained to characterize the topography of the transformation zone may be height values, also called sagittal values, of a surface of this zone. Put another way, the algorithm performs a phase conversion in each captured holographic image and identifies phase variations to sagittal variations that exist between different points of the transformation zone. In this manner, three-dimensional information is provided by the device of the invention for each image capture cycle by the sensor array, simultaneously for multiple points of the transformation zone. Three-dimensional representations of the transformation zone are thus collected while the piece is being manufactured, at a frequency which can be high enough to allow accurate monitoring and diagnosis of manufacturing conditions.

Preferably, the illumination optical path may be further adapted so that, at the transformation zone, a cross-sectional area of the illuminating beam is larger than the transformation zone. In this case, and when the holographic image has an entrance optical field of view that contains this transformation zone, each holographic image that is captured can represent the entire transformation zone. Complete monitoring and diagnosis of the manufacturing conditions for the piece thus result.

The manufacturing device of the invention may be of different types, for implementing various manufacturing processes. In particular, it may be of additive manufacturing type using selective fusion produced by laser on powder bed (LBM). In such manufacturing device, the energy supply means comprise a fusion laser and focusing optics adapted for focusing, on the transformation zone, a fusion laser beam produced by the fusion laser. In this manner, a melt pool is selectively formed in the transformation zone from a powder of the material that is intended to form the piece. Alternatively, the manufacturing device of the invention may be adapted to produce a weld, or be configured for other techniques for manufacturing pieces which make use of a material transformation zone.

When the device of the invention is of the LBM type, at least part of the focusing optics may be arranged on a portion common to the illumination optical path and to the transfer optical path, so that the illuminating beam is incident onto the transformation zone after having passed through this part of the focusing optics. Simultaneously, the backscattered radiation passes through this part of the focusing optics in direction of the image sensor array. The optical illuminating beam and the radiation which is backscattered from the transformation zone thus share a same optical path portion, and also share it with the fusion laser beam. This results in a reduction in the number of optical components, making it possible to reduce the volume occupied near the melt pool, and thus to reduce interferences that could be caused by components which are close to this area.

Advantageously, the part of the focusing optics which is arranged on the portion common to the illumination optical path and to the transfer optical path may comprise a two-dimensional scanning optical module, so that the fusion laser beam, the illuminating beam, and the backscattered radiation are simultaneously deflected by this two-dimensional scanning optical module. In this manner, the optical field of view of the holographic image can be limited to dimensions similar to or slightly greater than those of the transformation zone, i.e. those of the melt pool for an LBM process. A higher spatial resolution can thus be obtained in each holographic image for the transformation zone, even if this zone moves during manufacture of the piece.

More advantageously, when the device of the invention is of the LBM type, the part of the focusing optics which is arranged on the common portion of the illumination optical path and of the transfer optical path may further comprise an optical module with variable focusing distance, or DFM for "Dynamic Focus Module". This DFM module may then be located upstream of the two-dimensional scanning optical module for the fusion laser beam and the illuminating beam, and can be effective simultaneously for the fusion laser beam, the illuminating beam, and the backscattered radiation. Such DFM module makes it possible to maintain a holographic image which is sharp or sharp enough when the distance from the transformation zone varies during movement of this transformation zone produced by the two-dimensional optical scanning module.

In general, the transfer optical path may comprise at least a first converging lens and a second converging lens, which are arranged to be successively traversed by the backscattered radiation produced by the illuminating beam when this latter beam is incident onto the transformation zone, and so that the image focus point of the first converging lens is superimposed on the object focus point of the second converging lens. The addition of these lenses makes it possible, by moving one relative to the other, to easily compensate for any residual defocusing of the optical inspection means, in particular a focusing error which would remain with respect to the efficiency of the DFM module when such DFM module is used. Optionally, a defocusing of the DFM module may be applied deliberately, for example so that the illuminating beam illuminates a wider environment around the transformation zone. In this case, both converging lenses added to the transfer optical path can make it possible to compensate for such deliberate defocusing, so that the image captured by the sensor array remains sharp. Finally, the addition of both converging lenses can also allow easily adjusting the pupil of the optical inspection means, in particular by placing a diaphragm downstream of these two lenses according to the direction of propagation of the backscattered radiation in the transfer optical path.

Also generally for the invention, the transfer optical path may advantageously comprise a filter adapted for transmitting the backscattered radiation produced by the illuminating beam when it is incident onto the transformation zone, selectively with respect to thermal radiation that is emitted by the transformation zone. Such filter can increase the contrast of the holographic images.

Generally for the invention, the reference beam and the backscattered radiation may form a digital holography configuration in an image plane, commonly referred to as DIPH, for "Digital Image-Plane Holography". Such configuration advantageously allows adjusting an optical magnification that is effective between the transformation zone and the image sensor array. Additionally, the reference beam may have a collimated beam configuration at the image sensor array.

When a DIPH configuration is thus implemented, the reference beam and a central direction of propagation of the backscattered radiation may advantageously form a non-zero angle at the image sensor array. Such configuration is called "off-axis". Then, the algorithm that is executed by the processor may be adapted to characterize the topography of the transformation zone from at least one holographic order value selected among +1 or −1. The holographic order value equal to 0 is excluded for obtaining this topographic characterization. Preferably, only one of the holographic order values +1 and −1 is used, but using both values +1 and −1 is possible.

However, depending on the topography of the transformation zone, its characterization by the invention may be rendered more difficult or be affected by the following two causes:
the surface of the transformation zone may present sagittal variations, producing variations in the separation distance which are greater than half the wavelength of the inspection light source used. This results in a folding of the phase values which are extracted from the holographic image, and a need to implement a phase unwrapping operation; and
the surface of the transformation zone may have significant roughness which produces "speckles", and degrades the topographic characterization obtained.

The following improvement of the invention, which is optional, can make it possible to remedy at least one of these two difficulties. For this improvement, the optical inspection means may comprise at least two inspection light sources, which are formed by respective laser sources having different wavelengths but with a difference between them that is less than 2% of each of these two wavelengths. The optical inspection means are then arranged so that both inspection light sources simultaneously illuminate the transformation zone. Each inspection light source is associated with a respective reference optical path, and transfer optical paths are functional simultaneously for the two inspection light sources between the transformation zone and the image sensor array. Preferably, both inspection light sources may share a same transfer optical path. Advantageously, they may also share a same final portion of the illumination optical path, in particular such final portion of the illumination optical path which is also shared with the fusion laser beam for an LBM type of device. In this case, the final portion of the illumination optical path which is common to both inspection light sources may comprise the two-dimensional scanning optical module, as well as the DFM module where applicable.

According to this improvement, the algorithm that is executed by the processor is furthermore adapted for isolating, in the holographic image, image components which are each formed by the backscattered radiation and the reference beam caused by a same one of the two inspection light sources, one image component separately for each inspection light source. The two image components which are thus isolated correspond to a same holographic order value which is equal to +1 or −1. The algorithm is then also adapted for separately extracting two phase values, for each of a multitude of image points of the holographic image, from both isolated image components, then calculating a difference between the two phase values for each image point, and characterizing the topography of the transformation zone by associating results of the differences in phase values with a synthetic wavelength value which is equal to the product of the two wavelengths of the inspection light sources, divided by the absolute value of the difference between these two wavelengths. This synthetic wavelength value may be large, so that the topographic characterization of the transformation zone that is associated with it is less sensitive to the abrupt sagittal variations that may exist in the surface of the transformation zone, in comparison with the topographic characterizations that can be obtained separately for each of the two respective wavelengths of the two inspection light sources. For this reason, the topographic characterization obtained for the synthetic wavelength value shows fewer speckles. The large value of the synthetic wavelength can also eliminate the need to unwrap the results of the phase value differences. To this end, the respective wavelengths of both inspection light sources preferably may have a difference between them which is less than 1%, or even less than 0.5%, of each of the wavelengths of these two sources.

BRIEF DESCRIPTION OF THE DRAWINGS

The features and advantages of the invention will become more clearly apparent from the following detailed description of some non-limiting embodiments, with reference to the appended figures, which include.

DESCRIPTION OF THE PREFERRED EMBODIMENTS

Figure 1:
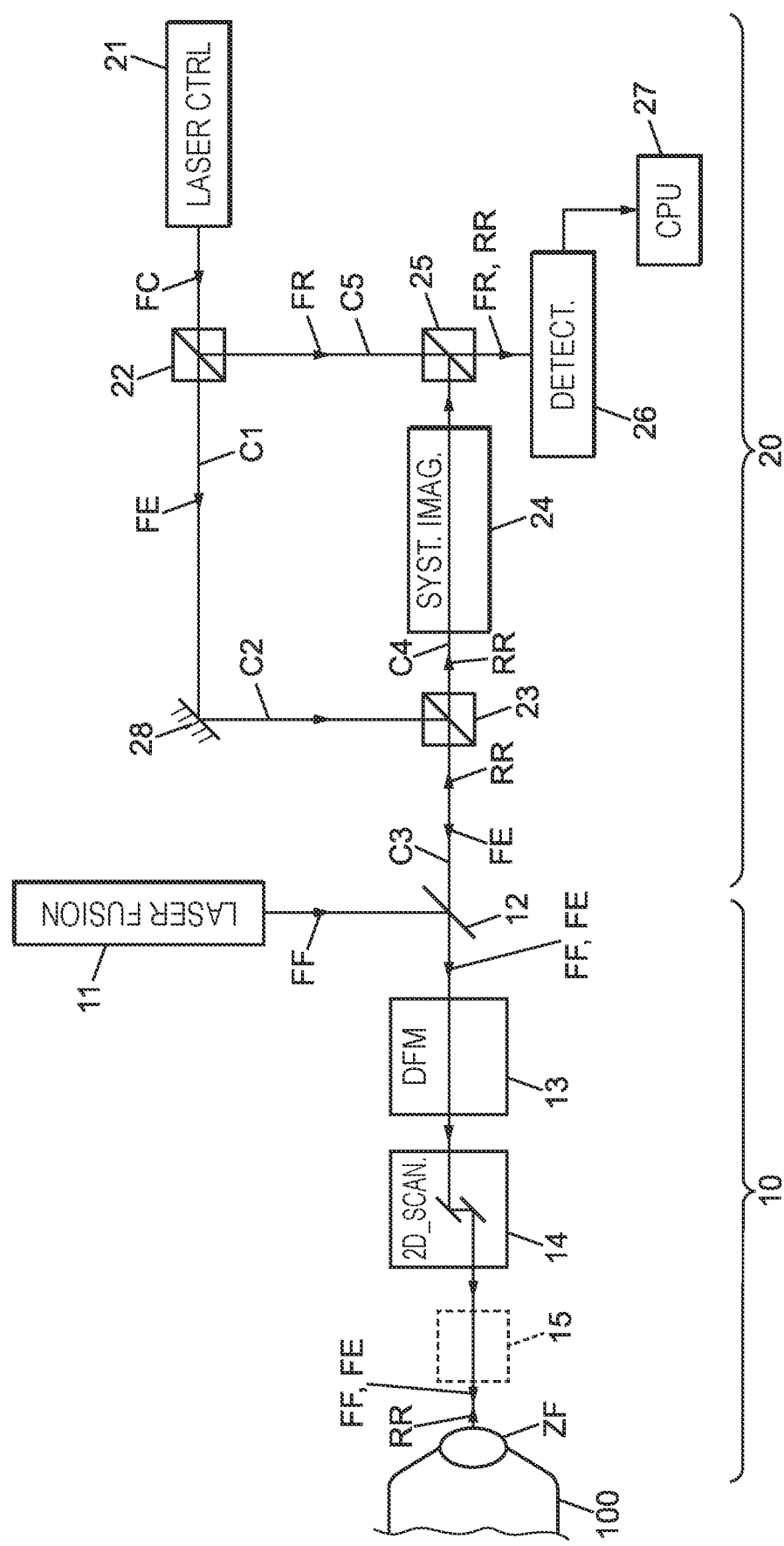
FIG. 1 is a block diagram of a manufacturing device according to the invention, with a single inspection light source.

For clarity sake, the dimensions of the elements shown in these figures correspond neither to actual dimensions nor to actual dimensional ratios. Furthermore, some of these elements are represented only symbolically, and identical references indicated in different figures designate elements which are identical or which have identical functions.

In general, polarization control means may be used in the embodiments of the invention which are described below, to produce the interferences which result in the captured holographic images. Other polarization control means are also routinely incorporated into each polarizing beamsplitter that is used. But given that such polarization control means are all well known to those skilled in the art, they are not described below for the sake of clarity.

Similarly, means for widening the cross-sectional areas of the light beams may also be used, in one of the ways again known to those skilled in the art, and which will therefore also not be described.

By way of illustration, but without being a limitation, the invention is now described in the case of an additive manufacturing device commonly referred to as a 3D-printer. More specifically, the invention is described in the case of an LBM type of device. In accordance with [FIG. 1], this device comprises the LBM manufacturing apparatus, which is denoted as a whole by reference number 10, and optical inspection means, which are added by the invention and denoted as a whole by reference number 20.

As is known, the apparatus 10 comprises a power laser source 11, denoted LASER FUSION and which produces a fusion laser beam FF. For example, the source 11 may be a ytterbium-doped fiber laser, which produces the fusion beam FF with a high output power and a wavelength of 1064 nm (nanometers) or 1070 nm. Other types of laser may alternatively be used for the source 11, for example to produce the fusion beam FF with a wavelength value equal to 532 nm, depending on the absorption features of the material to be melted. The fusion beam FF is directed onto a piece being manufactured, denoted by reference number 100. For its manufacture, portions of material are progressively added to the piece 100, being melted at the locations of the piece 100 where these portions of material are to be added. For this purpose, a melt pool of the material is generated locally by the fusion beam FF, which results in the attachment of portions of material added to the portion of the piece 100 which has already been manufactured. More generally, the melt pool forms a material transformation zone, which is denoted by the reference ZF. The location on the piece 100 being manufactured, to which the material is added is selected using a two-dimensional optical scanning module 14, denoted 2D_SCAN. Two optical configurations may be used in alternation to adjust the focusing distance of the fusion beam FF along its direction of propagation. Thus, the fusion beam FF is kept focused on the surface of transformation zone ZF for each location of the piece being manufactured where material is selectively being added at a given moment. In the first configuration, an optical module with variable focusing distance 13, denoted DFM for "Dynamic Focus Module", is added on the path of the fusion beam FF, upstream of the two-dimensional scanning optical module 14 relative to the direction of propagation of the fusion beam FF. All the appended figures correspond to this first configuration. In the second configuration, an optical module with F-Theta lens, or an optical module that incorporates a flat field lens, is placed in the path of the fusion beam FF downstream of the two-dimensional scanning optical module 14. Either of these modules, with F-Theta or flat-field lenses, is indicated by the reference number 15 in [FIG. 1]. The use of an F-Theta lens can simplify control of the two-dimensional scanning optical module 14 in comparison to the case where a flat-field lens is used. The modules 13 and 14, or 14 and 15 depending on the configuration used, together form the focusing optics within the meaning of the general part of this description. However, the first configuration, which combines the dynamic focus optical module 13 with the two-dimensional scanning optical module 14, may be preferred because its efficiency simultaneously for several wavelengths, i.e. for the wavelength of the fusion beam FF and also for at least one illuminating beam and the backscattered radiation that is produced by this illuminating beam, as described below, is facilitated by the fact that all these beams remain on the optical axis. This description continues for such first configuration. The two-dimensional scanning optical module 14 may be of a model with two galvanometric mirrors. The dynamic focus optical module 13 may comprise an optical doublet composed of a diverging lens 131 followed by a converging lens 132 (see [FIG. 2]), along the direction of propagation of the fusion beam FF. The diverging lens 131 is then moved along the optical axis to adjust the distance at which the fusion beam FF is focused, within the volume available for the piece 100 being manufactured. Typically, the transformation zone ZF may have a size of about 0.5 mm (millimeter) in each of three orthogonal spatial directions, for a piece 100 which may have dimensions of a few millimeters to several tens of centimeters in each direction.

In accordance with the invention, the manufacturing apparatus 10 is supplemented with the optical inspection means 20, which are suitable for characterizing the topography of the transformation zone ZF by providing a three-dimensional representation thereof. According to a preferred configuration for implementing the invention, the optical inspection means 20 are arranged to illuminate the transformation zone ZF and to collect radiation which is backscattered by this zone according to the illumination optical path and transfer optical path which are both superimposed on the optical path of the fusion beam FF, through modules 13 and 14. For this purpose, the modules 13 and 14 are designed to be effective simultaneously at the wavelength of the power laser source 11, and at least one other radiation wavelength that is used by the optical inspection means 20. Such configuration allows the optical inspection means 20 to keep transformation zone ZF inside their imaging optical field of view, despite the movements of the transformation zone ZF which are produced by the module 14, and while maintaining a sufficient imaging magnification and a sufficient spatial resolution.

The optical inspection means 20 comprise at least one inspection light source, which is a laser source 21 and is denoted LASER CTRL in the figures. The inspection laser source 21 has an emission spectrum which is different, and preferably disjoint, from that of the power laser source 11. For example, the inspection laser source 21 can be adapted to produce an inspection laser beam FC which has a wavelength equal to approximately 632 nm.

The inspection laser beam FC is split into two parts, for example using a first beamsplitter, which may be a polarizing beamsplitter 22. A first part of the inspection laser beam FC which is thus generated constitutes an illuminating beam FE. The illuminating beam FE is brought to be superimposed with the fusion beam FF upstream of the module 13, for example using a dichroic filter plate 12. The illuminating beam FE is then transmitted by the modules 13 and 14 to the transformation zone ZF, together with the fusion beam FF, then backscattered by this zone ZF with no change in the wavelength value. The radiation which is thus backscattered, denoted RR, is transmitted in return by the module 14, then 13, and is separated from the fusion beam FF by the dichroic filter plate 12, then separated from the illuminating beam FE by a second polarizing beamsplitter 23. The radiation RR then passes through an imaging system 24, which is denoted SYST. IMAG. and designed to form an image of the transformation zone ZF on an image sensor array 26 denoted DETECT. The imaging system 24 ensures the optical conjugation of the photosensitive surface of the image sensor array 26 with the transformation zone ZF, in combination with the module 13 and taking into account the scanning deviation which is produced by the module 14.

Preferably, the illuminating beam FE simultaneously illuminates the entirety of the transformation zone ZF. Put another way, the illuminating beam FE has a cross-sectional area at the transformation zone ZF which is larger than this latter zone.

A second part of the inspection laser beam FC, which is separated from the illuminating beam FE by the polarizing beamsplitter 22, constitutes a reference beam, denoted FR. This reference beam FR is superimposed on the backscattered radiation RR by an amplitude-dividing beamsplitter 25, such as a semi-reflective plate or a semi-reflective cube. In this manner, the image formed on the sensor array 26 is a holographic image, in which the variations in light intensity contain phase information. The holographic image results from interference, at the image sensor array 26, between the reference beam FR and the backscattered radiation RR.

Optionally, one or more deflection mirror(s) 28 may further be used to determine the optical path of at least one among the illuminating beam FE, backscattered radiation RR, and reference beam FR. In accordance with [FIG. 2], the imaging system 24 may be composed of three converging lenses $24_1$-$24_3$ which are arranged in series between the beamsplitters 23 and 25. Starting from the polarizing beamsplitter 23, and in the direction of propagation of the backscattered radiation RR, the converging lenses $24_1$ and $24_2$ may be spaced apart so that the image focus point of the lens $24_1$ is close to the object focus point of the lens $24_2$. The lens $24_3$ has a focal length value such that its image focal plane is approximately superimposed on the photosensitive surface of the image sensor array 26. With such composition for the imaging system 24, it is possible to precisely focus the image which is captured by the sensor array 26, depending on the actual distance from transformation zone ZF, by moving the lens $24_2$ longitudinally. In this manner, a residual image focusing error can be easily corrected, with respect to the operation of the module 13. A defocusing of the module 13 which is deliberately applied can also be compensated for by an appropriate longitudinal position of the lens $24_2$. Such focus adjustments carried out using the lens $24_2$ are preferably performed before the manufacture of the piece 100 begins, then maintained during its manufacture. Furthermore, the imaging system 24 makes it possible to easily adjust the imaging pupil, for example by placing a diaphragm D between the lenses $24_2$ and $24_3$, if such a pupil is not determined elsewhere. Finally, the imaging system 24 provides a DIPH configuration. One of the advantages of such configuration is to allow adjusting the apparent size of the transformation zone ZF inside each holographic image.

In [FIG. 1], C1 and C2 designate optical path portions which are followed by the illuminating beam FE, respectively between polarizing the beamsplitter 22 and the deflection mirror 28, and between this deflection mirror 28 and the polarizing beamsplitter 23. C3 denotes the optical path portion between the polarizing beamsplitter 23 and the transformation zone ZF. C4 denotes the optical path portion followed by the backscattered radiation RR between the polarizing beamsplitter 23 and the image sensor array 26. Finally, C5 denotes the optical path portion followed by the reference beam FR between the polarizing beamsplitter 22 and the image sensor array 26. The correlation with the terminology used in the general part of this description is then as follows:

- the optical path portions C1, C2, and C3 together form the illumination optical path, which is followed by the illuminating beam FE in direction of the transformation zone ZF;
- the optical path portions C3 and C4 together form the transfer optical path, which is followed by the backscattered radiation RR from the transformation zone ZF; and
- the optical path portion C5 forms the reference optical path, which is followed by the reference beam FR.

The optical path portion C3 is thus common to the illumination optical path and to the transfer optical path, and also to the fusion beam FF.

The illuminating beam FE may have a collimated beam configuration in the optical path portions C1, C2 and C3, all the way to the dynamic focus optical module 13. The backscattered radiation RR may also have a collimated beam configuration between the dichroic filter plate 12 and the polarizing beamsplitter 23. Finally, the reference beam FR may similarly have a collimated beam configuration in the optical path portion C5.

The dichroic filter plate 12 may perform the additional function of filtering the backscattered radiation RR to be transmitted in direction of the image sensor array 26, selectively relative to thermal radiation which may also originate from the transformation zone ZF. The holographic images captured by the sensor array 26 are thus not contaminated by the thermal radiation.

Figure 2:
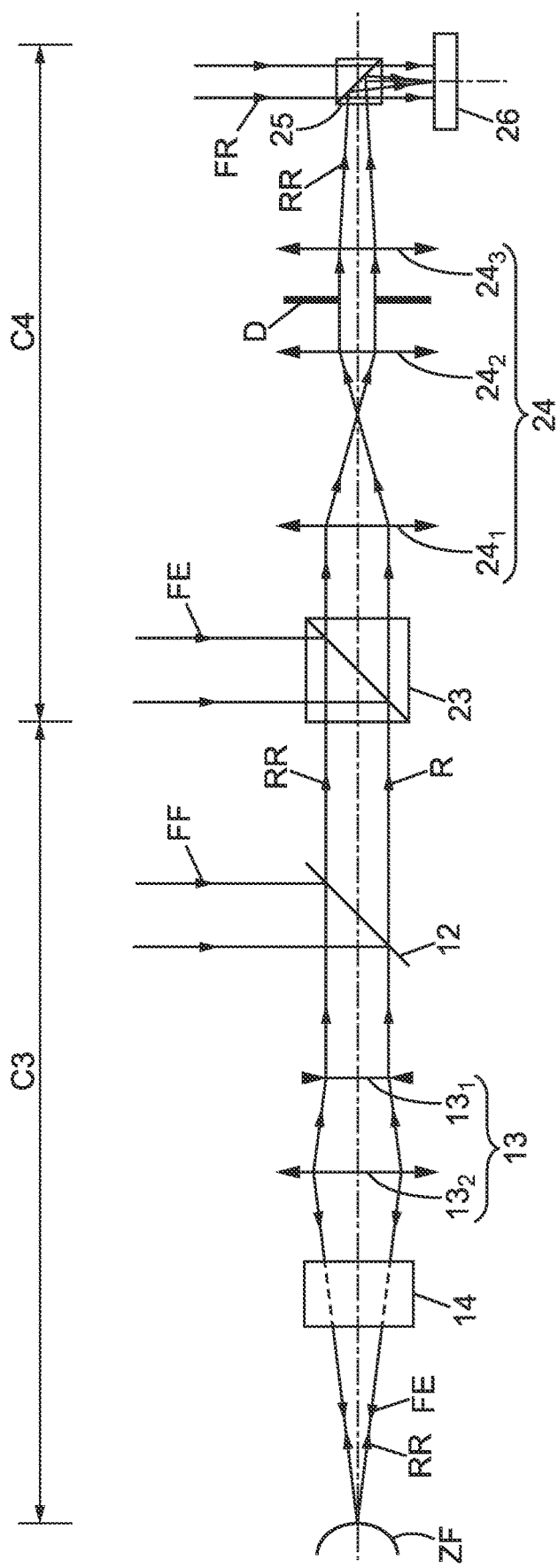
FIG. 2 shows an example composition for a transfer optical path, as may be used in the device of [FIG. 1]

[FIG. 2] shows the components of the transfer optical path which were listed above. These components are advantageously selected so that each holographic image captured by the sensor array 26 contains the entirety of the transformation zone ZF.

The phase variations contained in each holographic image correspond to variations in the distance at which different points of the surface of the transformation zone ZF lie, relative to the module 13 through the module 14. When it is desired to reveal more precisely, in each captured holographic image, portions of the surface of the transformation zone ZF which are located substantially at a constant separation distance, it is possible to tilt the direction of propagation of the reference beam FR in the optical path portion between the amplitude-dividing beamsplitter 25 and the image sensor array 26, relative to the central direction of propagation of the backscattered radiation RR.

The analysis of each holographic image captured by the sensor array 26 is carried out by a processor 27, which is denoted CPU in the figures. Alternatively, a GPU type of processor may be used. In a known manner, the algorithm of such an analysis comprises the following steps in particular:

/1/ extracting phase values by digitally processing the intensity variations contained in each holographic image: a phase value is thus assigned to each image point;

/2/ converting each phase value into a value for the distance from the surface of the transformation zone ZF, then into a sagittal value for this surface;

/3/ converting the two Cartesian coordinates of the holographic image into Cartesian coordinate values defined in the entrance optical field of view, at the powder bed and perpendicular to the optical axis of the optical path portion C3; then /4/ constructing a three-dimensional representation of the transformation zone ZF by associating, for each image point of the holographic image being analyzed, the values of the Cartesian coordinates in the entrance optical field of view with the sagittal value.

Such holographic image analysis can be carried out very quickly by the processor 27. It is thus possible to obtain a time sequence which is composed of several successive three-dimensional representations of the transformation zone ZF, in real time while the piece 100 is being manufactured.

Frequently, step/1/ may be carried out by first applying a two-dimensional Fourier transform to the holographic image as captured by the sensor array 26, relative to both Cartesian coordinates of this image. Such transformation usually causes three components to appear in the transformed image:

a component of order 0, which corresponds to the average intensity of the reference beam FR and of the backscattered radiation RR, with possible contributions from incoherent radiation that may exist at the same wavelength as the inspection laser source 21;

a component said to be of order 1, which contains the holographic image information and which reproduces the three-dimensional shape of the surface of the transformation zone ZF; and a component said to be of order −1, which corresponds to the component of order 1 by a space-symmetry operation and by a complex conjugation operation.

Only one of the components of order 1 or −1 is useful. In the transformed image, the three components of order 0, +1, and −1 appear as distinct lobes. One of the lobes, which corresponds to the component of order 1 or −1, is filtered to exclude the lobe which corresponds to the other one of the components of order 1 and −1, and also to exclude the lobe which corresponds to the component of order 0. An inverse two-dimensional Fourier transform is then applied to the transformed and filtered image, i.e. reduced to the single selected lobe. A new image is thus obtained, which assigns a value for a complex amplitude to each image point identified by both Cartesian coordinate values. The phase values of this complex amplitude, mod $2\pi$, are then extracted from the new image, for all image points. They are converted into variations in sagittal value in order to obtain a topographic characterization of the transformation zone ZF, according to the formula: $\Delta h = \lambda \cdot \Delta\varphi/(4 \cdot \pi \cdot \cos\theta)$, where $\Delta h$ is the variation in sagittal value between two image points, $\lambda$ is the wavelength of the inspection laser source 21, $\Delta\varphi$ is the phase variation which is read in the new image between the two image points, and $\theta$ is the angle between the direction of the illuminating beam FE and the direction perpendicular to a reference plane used to determine the variations in sagittal height. This reference plane is coincident with the surface of the powder bed in the LBM manufacturing device.

However, the conversion of the phase values into variations in sagittal value may require unwrapping the phase values when the transformation zone ZF presents variations in sagittal value which are greater than half the value of the wavelength used. Such an unwrapping operation may be difficult, however. Moreover, the obtained three-dimensional representation of the transformation zone ZF is often affected by speckles. These speckles are due to roughness present on the surface of the transformation zone ZF. To reduce or eliminate at least one of these disadvantages, it is possible to use a manufacturing device in accordance with [FIG. 3]. In comparison to the device of [FIG. 1], a second inspection light source has been added. This second inspection light source consists of another laser source 21', which has a different emission wavelength than that of the laser source 21. For the laser source 21', the polarizing beamsplitter 22' and the optical path portions C1', C2', and C5' have identical functions to the polarizing beamsplitter 22 and the optical path portions C1, C2, and C5 as described above for the laser source 21. A semi-reflective plate 31 has the function of making the optical path portion C3 common to the illuminating beams FE and FE'. The optical path portions C3 and C4 are then common to the backscattered radiation RR and RR' which are respectively generated by both laser sources 21 and 21'. Another semi-reflective plate 32 has the function of superimposing the reference beams FR and FR', which respectively originate from both laser sources 21 and 21'. In this manner, both backscattered radiations RR and RR', as well as both reference beams FR and FR', interfere on the photosensitive surface of the image sensor array 26. Reference number 29 denotes an additional deflection mirror which may be used in the optical path portion C5'. Both laser sources 21 and 21' are continuously activated together during the manufacture of the piece 100. Under these conditions, each holographic image comprises the following holographic image contributions:

a first image contribution which results from the superposition of the reference beam FR originating from the laser source 21, with the backscattered radiation RR which is produced by the illuminating beam FE also originating from the laser source 21. This first holographic image contribution is identical to that described above with reference to [FIG. 1], and comprises the three components of order 0, +1, and −1 before filtering; and a second image contribution which results from the superposition of the reference beam FR' originating from the other laser source 21', with the backscattered radiation RR' which is produced by the illuminating beam FE' also originating from the other laser source 21'. This second holographic image contribution is based on the same principle as the previous one but transposed to the wavelength value of the laser source 21'. It also comprises three components of order 0, +1, and −1 before filtering.

Both laser sources 21 and 21' may be stabilized laser diodes, for example with emission wavelengths which may equal 632.8 nm and 634.8 nm, respectively. A synthetic wavelength value $\lambda_s$, which will be useful in the algorithm to characterize the topography of the transformation zone ZF, equals $(\lambda \cdot \lambda')/\Delta\lambda$, where $\lambda$ is the emission wavelength of the laser source 21, $\lambda'$ that of the laser source 21', and $\Delta\lambda$ is the absolute value of the difference between A and A'.

Then, each holographic image captured by the sensor array 26 can be analyzed by the processor 27 by executing the following improved algorithm:

first, calculating the two-dimensional Fourier transform of the holographic image, relative to its two Cartesian space coordinates;

filtering the transformed image in order to extract only the component of order +1 of the image contribution which is associated with the laser source 21, corresponding to wavelength value $\lambda$, then the method is continued as indicated above for the case of a single inspection light source, so as to extract first phase values $\varphi_1(i, j)$ for the image points of coordinates i and j;

independently, filtering the transformed image to extract only the component of order +1 of the image contribution which is associated with the laser source 21', corresponding to wavelength value λ', then the method is repeated to extract second phase values φ₂(i, j). If necessary, both filterings can isolate the components of order −1, but the same value of order +1 or −1 is to be used to filter the transformed image with respect to each of the two laser sources 21 and 21';

for each image point (i, j), calculating the difference in phase values φ₁(i, j)−φ₂(i, j); then using the results of the differences φ₁(1, j)−φ₂(i, j) as phase values φ for the phase associated with image point (i, j) and with the value of the synthetic length $\lambda_s$ in order to obtain a new three-dimensional representation of the transformation zone ZF. Put another way, the new three-dimensional representation of the transformation zone ZF is obtained by the formula: $\Delta h = \lambda_s \cdot \Delta[\varphi_1(i, j) - \varphi_2(i, j)]/(4 \cdot \pi \cdot \cos \theta)$, where Δ[φ₁(i, j)−φ₂(i, j)] is the variation of the result which is obtained for the phase difference φ₁(i, j)−φ₂(i, j) between two different image points, Δh being the variation in sagittal value between these two image points and θ having the same meaning as above.

Figure 3:
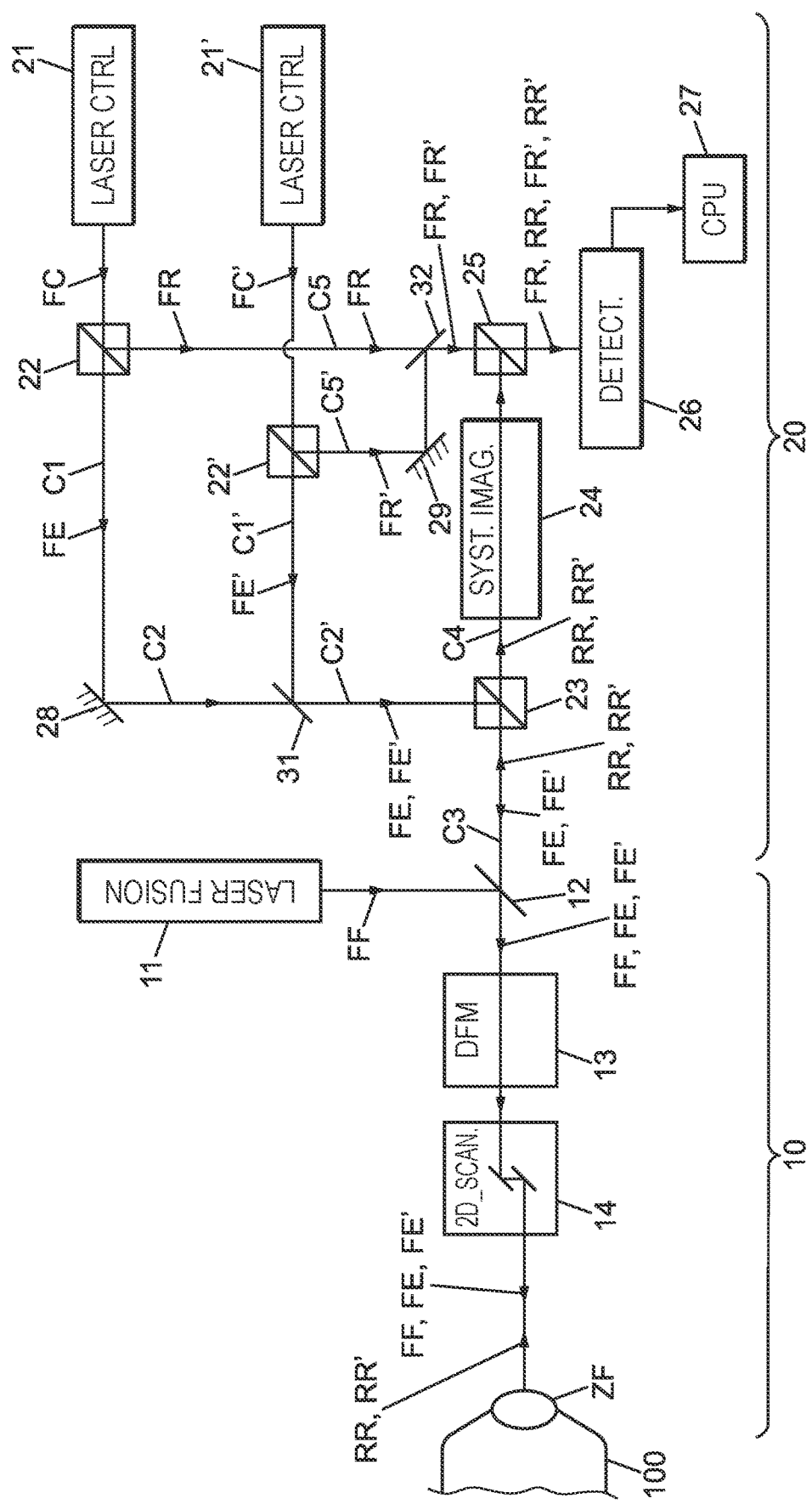
FIG. 3 corresponds to [FIG. 1] for improvements of the invention with two inspection light sources.
Figure 4:
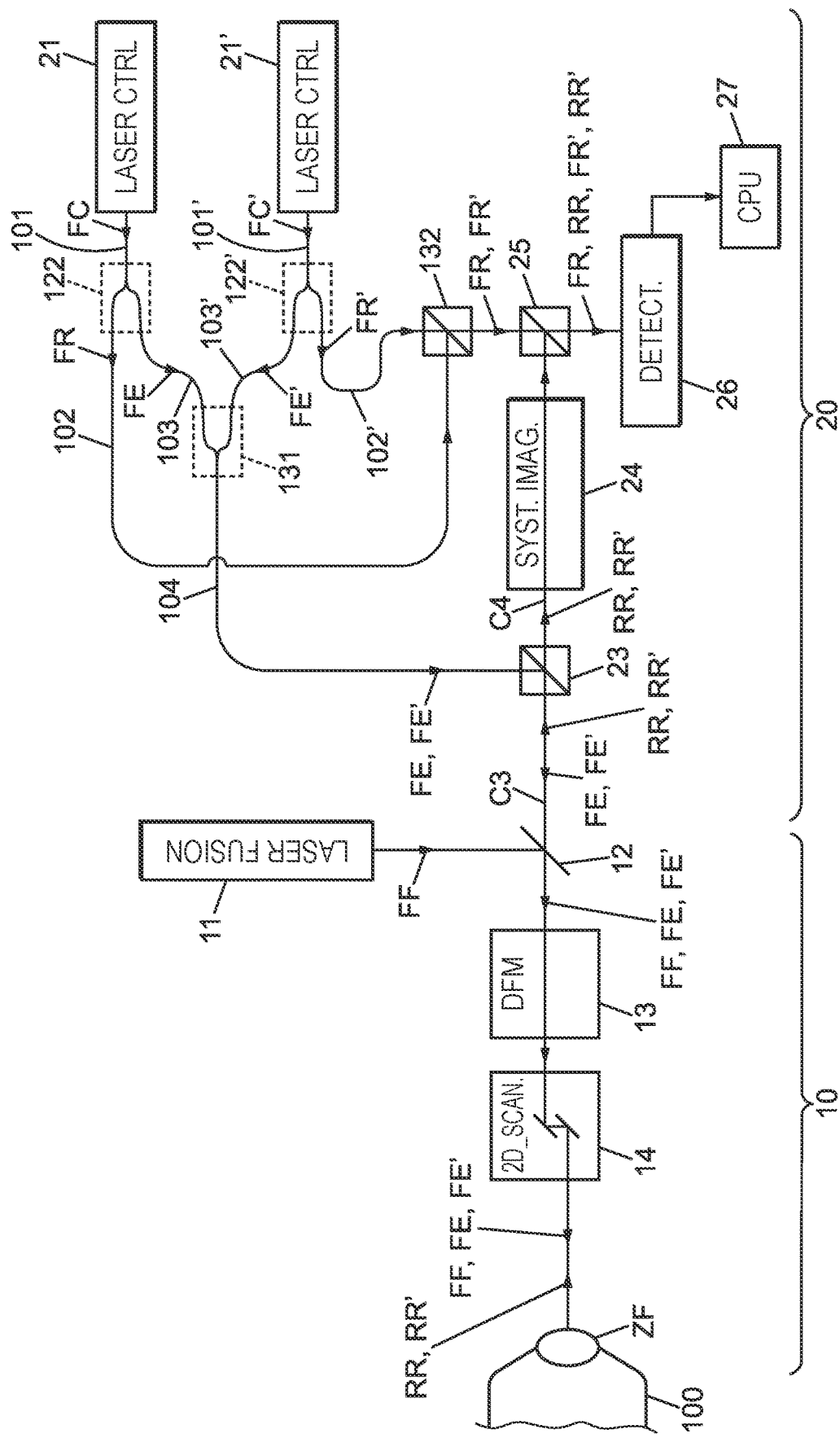
FIG. 4 corresponds to [FIG. 3] for an embodiment of the invention with optical fibers.

[FIG. 4] corresponds to [FIG. 3], using connections based on optical fibers and optical couplers for connecting the optical outputs of the inspection laser sources 21 and 21'. Preferably, the fibers and couplers used are single-mode and polarization-maintaining. Thus, an optical fiber 101 connects the optical output of the laser source 21 to an input of a coupler 122, whose function is similar to that of the beamsplitter 22. A first output of the coupler 122 then transmits the reference beam FR to an optical fiber 102, which conducts this reference beam FR to a semi-reflective cube 132 whose function is similar to that of the semi-reflective plate 32. Simultaneously, an optical fiber 101' connects the optical output of the laser source 21' to an input of a coupler 122', whose function is similar to that of the beamsplitter 22'. A first output of the coupler 122' transmits the reference beam FR' to an optical fiber 102' which conducts this reference beam FR' to the semi-reflective cube 132. The semi-reflecting cube 132 thus simultaneously transmits both reference beams FR and FR' to the amplitude-dividing beamsplitter 25. Furthermore, an optical fiber 103 transmits the illuminating beam FE from a second output of the coupler 122 to a first input of a 50/50 coupler, denoted by the reference 131. Similarly, an optical fiber 103' transmits the illuminating beam FE' from a second output of the coupler 122' to a second input of the coupler 131. The coupler 131 has a function similar to that of the semi-reflective plate 31, and outputs together both illuminating beams FE and FE' to the polarizing beamsplitter 23, via an optical fiber 104. Such embodiment based on optical fibers makes it possible to simplify the device of the invention, and to reduce alterations in optical alignment which could occur between certain of the optical components used.

It is understood that the invention may be reproduced with modifying secondary aspects of the embodiments described in detail above, while retaining at least some of the cited advantages. In particular, some of the optical components described may be replaced by other components having equivalent functions. For example, at least one of the dichroic filter plates mentioned may be replaced by a dichroic filter cube placed at the same location. Similarly, at least one of the polarizing beamsplitters may be replaced by an amplitude-dividing beamsplitter. In addition, although the invention has been described in detail for an LBM type of additive manufacturing device, it may be used for other types of manufacturing devices which implement a transformation zone, for example such as an electron beam powder bed fusion manufacturing device, devices which implement DED ("Directed Energy Deposition") techniques, such as in the CLAD (Direct Additive Laser Construction) process or in the LENS ("Laser Engineered Net Shaping") process, etc. Similarly, the invention may also be applied to welding devices, to inspect the fusion zone of the weld bead. It may also be applied to many other manufacturing devices which make use of a transformation zone, including for the manufacturing of pieces made of ceramic material. When these devices do not use a laser beam to provide the energy required for the transformation of the added portions of material, the illumination optical path is independent of the elements used to provide this transformation energy.

Finally, all the numerical values that have been cited have been provided solely by way of example and can be changed according to each application of the invention.

The invention claimed is:

1. A manufacturing device for manufacturing a piece with addition of material, comprising energy supply means adapted to transform a quantity of material to be added to the piece being manufactured, within a transformation zone of the material which is effective at a time when said quantity of material is being fixed to the piece, the manufacturing device further comprising optical inspection means for providing at least one representation of the transformation zone in real time while the piece is being manufactured, said optical inspection means comprising:

at least one inspection light source, adapted for producing an inspection light beam;
   an image sensor array;
   a beamsplitter, arranged to split the inspection light beam into an illuminating beam and a reference beam;
   an illumination optical path, continually connecting the beamsplitter to the transformation zone while the piece is being manufactured, and intended for the illuminating beam;
   a reference optical path, continually connecting the beamsplitter to the image sensor array while the piece is being manufactured, and intended for the reference beam; and
   a transfer optical path, continually connecting the transformation zone to the image sensor array while the piece is being manufactured, and intended for the backscattered radiation that is produced by the illuminating beam when said illuminating beam is incident onto the transformation zone, said transfer optical path being adapted so that the backscattered radiation forms an image of the transformation zone on the image sensor array, the optical inspection means being arranged so that the image sensor array produces, for each readout sequence of said image sensor array, readout data which correspond to a superposition of the backscattered radiation transmitted by the transfer optical path with the reference beam transmitted by the reference optical path, each inspection light source being a laser source, and the readout data from the image sensor array, for each readout sequence of said image sensor array, forming a holographic image of the transformation zone which relates to a time when the piece is being manufactured, the optical inspection means further comprising at least one processor adapted for executing an algorithm for extracting a two-dimensional phase distribution from the holographic image, and converting the two-dimensional phase distribution into numerical values which characterize a topography of the transformation zone, so as to provide a three-dimensional representation of said transformation zone, the manufacturing device being of additive manufacturing type using selective melting produced by laser onto powder bed, wherein the energy supply means comprise a fusion laser and focusing optics adapted for focusing, on the transformation zone, a fusion laser beam produced by the fusion laser, so as to form selectively in said transformation zone, a melt pool from a powder of the material that is intended to form the piece, and wherein at least part of the focusing optics is arranged on a portion common to the illumination optical path and to the transfer optical path, so that the illuminating beam is incident onto the transformation zone after having passed through said part of the focusing optics, and the backscattered radiation passes through said part of the focusing optics in the direction of the image sensor array.

2. The manufacturing device according to claim 1, wherein the illumination optical path is further adapted so that, at the transformation zone, a cross-sectional area of the illuminating beam is larger than the transformation zone, and the manufacturing device is adapted so that the holographic image has an entrance optical field of view which contains the transformation zone.

3. The manufacturing device according to claim 1, wherein the part of the focusing optics which is arranged on the portion common to the illumination optical path and to the transfer optical path comprises a two-dimensional scanning optical module, so that the fusion laser beam, the illuminating beam, and the backscattered radiation are simultaneously deflected by the two-dimensional scanning optical module.

4. The manufacturing device according to claim 3, wherein the part of the focusing optics which is arranged on the portion common to the illumination optical path and to the transfer optical path further comprises a dynamic focus optical module, said dynamic focus optical module being located upstream of the two-dimensional scanning optical module for the fusion laser beam and the illuminating beam, and being effective simultaneously for said fusion laser beam, said illuminating beam, and the backscattered radiation.

5. The manufacturing device according to claim 1, wherein the transfer optical path comprises at least a first converging lens and a second converging lens, which are arranged to be successively traversed by the backscattered radiation produced by the illuminating beam when said illuminating beam is incident onto the transformation zone, and so that an image focus point of the first converging lens is superimposed on an object focus point of the second converging lens.

6. The manufacturing device according to claim 1, wherein the transfer optical path comprises a filter adapted for transmitting the backscattered radiation produced by the illuminating beam when said illuminating beam is incident onto the transformation zone, selectively with respect to thermal radiation emitted by the transformation zone.

7. The manufacturing device according to claim 1, wherein the reference beam and the backscattered radiation form a digital holography configuration in an image plane, the reference beam further having a collimated beam configuration at the image sensor array.

8. The manufacturing device according to claim 7, wherein the reference beam and a central direction of propagation of the backscattered radiation form a non-zero angle at the image sensor array, and the algorithm that is executed by the processor is adapted to characterize the topography of the transformation zone from a single holographic order value selected among +1 or −1, or from both holographic order values +1 and −1.

9. The manufacturing device according to claim 1, wherein the optical inspection means comprise at least two inspection light sources, formed by respective laser sources having different wavelengths but with a difference between the different wavelengths that is less than 2% of each of said wavelengths, the optical inspection means being arranged so that both inspection light sources simultaneously illuminate the transformation zone, each inspection light source being associated with a respective reference optical path, and transfer optical paths, being functional simultaneously for the two inspection light sources between the transformation zone and the image sensor array, and the algorithm that is executed by the processor is furthermore adapted for isolating, in the holographic image, image components which are each formed by the backscattered radiation and the reference beam caused by a same one of the two inspection light sources, one image component separately for each inspection light source, and the two isolated image components correspond to a same holographic order value which is equal to +1 or −1;

and the algorithm is furthermore adapted for separately extracting two phase values, for each of a multitude of image points of the holographic image, from both isolated image components, then calculating a difference between the two phase values for each image point, and characterizing the topography of the transformation zone by associating results of the differences in phase values with a synthetic wavelength value which is equal to the product of the two wavelengths of the inspection light sources, divided by an absolute value of a difference between said two wavelengths.

10. The manufacturing device of claim 9, wherein the transfer optical paths are a common transfer optical path.

11. The manufacturing device according to claim 2, wherein the part of the focusing optics which is arranged on the portion common to the illumination optical path and to the transfer optical path comprises a two-dimensional scanning optical module, so that the fusion laser beam, the illuminating beam, and the backscattered radiation are simultaneously deflected by the two-dimensional scanning optical module.

12. The manufacturing device according to claim 2, wherein the transfer optical path comprises at least a first converging lens and a second converging lens, which are arranged to be successively traversed by the backscattered radiation produced by the illuminating beam when said illuminating beam is incident onto the transformation zone, and so that an image focus point of the first converging lens is superimposed on an object focus point of the second converging lens.

13. The manufacturing device according to claim 3, wherein the transfer optical path comprises at least a first converging lens and a second converging lens, which are arranged to be successively traversed by the backscattered radiation produced by the illuminating beam when said illuminating beam is incident onto the transformation zone, and so that an image focus point of the first converging lens is superimposed on an object focus point of the second converging lens.

14. The manufacturing device according to claim 4, wherein the transfer optical path comprises at least a first converging lens and a second converging lens, which are arranged to be successively traversed by the backscattered radiation produced by the illuminating beam when said illuminating beam is incident onto the transformation zone, and so that an image focus point of the first converging lens is superimposed on an object focus point of the second converging lens.

15. The manufacturing device according to claim 2, wherein the transfer optical path comprises a filter adapted for transmitting the backscattered radiation produced by the illuminating beam when said illuminating beam is incident onto the transformation zone, selectively with respect to thermal radiation emitted by the transformation zone.

16. The manufacturing device according to claim 3, wherein the transfer optical path comprises a filter adapted for transmitting the backscattered radiation produced by the illuminating beam when said illuminating beam is incident onto the transformation zone, selectively with respect to thermal radiation emitted by the transformation zone.

17. The manufacturing device according to claim 4, wherein the transfer optical path comprises a filter adapted for transmitting the backscattered radiation produced by the illuminating beam when said illuminating beam is incident onto the transformation zone, selectively with respect to thermal radiation emitted by the transformation zone.

18. The manufacturing device according to claim 5, wherein the transfer optical path comprises a filter adapted for transmitting the backscattered radiation produced by the illuminating beam when said illuminating beam is incident onto the transformation zone, selectively with respect to thermal radiation emitted by the transformation zone.

19. The manufacturing device according to claim 2, wherein the reference beam and the backscattered radiation form a digital holography configuration in an image plane, the reference beam further having a collimated beam configuration at the image sensor array.

20. The manufacturing device according to claim 3, wherein the reference beam and the backscattered radiation form a digital holography configuration in an image plane, the reference beam further having a collimated beam configuration at the image sensor array.

* * * * *